(12) United States Patent
Fazio (10) Patent No.: US 6,835,140 B2
(45) Date of Patent: Dec. 28, 2004

(54) BRUSH MOUNTING APPARATUS WITH RESTRICTED SWING AND METHODS THEREOF

(75) Inventor: Paul Fazio, Weston, FL (US)

(73) Assignee: Sonny's Enterprises, Inc., Tamarac, FL (US)

(*) Notice: Subject to any disclaimer, the term of this patent is extended or adjusted under 35 U.S.C. 154(b) by 177 days.

(21) Appl. No.: 09/995,101

(22) Filed: Nov. 27, 2001

(65) Prior Publication Data

US 2003/0051302 A1 Mar. 20, 2003

Related U.S. Application Data

(60) Provisional application No. 60/323,593, filed on Sep. 20, 2001.

(51) Int. Cl.[7] ................................................. F16D 3/41
(52) U.S. Cl. ....................................... 464/134; 464/136
(58) Field of Search ................................ 464/130, 132, 464/134, 135, 136

(56) References Cited

U.S. PATENT DOCUMENTS

| | | | |
|---|---|---|---|
| 135,404 A | * | 2/1873 | Cathcart .................. 464/136 X |
| 1,307,674 A | * | 6/1919 | Kiehne .................... 464/136 X |
| 2,024,410 A | * | 12/1935 | Williams ................. 464/130 X |
| 3,204,428 A | * | 9/1965 | Stokely ....................... 464/130 |
| 3,304,565 A | | 2/1967 | Fuhring |
| 3,471,883 A | | 10/1969 | Ennis |
| 3,708,816 A | | 1/1973 | Napoli |
| 3,772,724 A | | 11/1973 | Wilson |
| 3,777,326 A | | 12/1973 | Haley et al. |
| 3,793,667 A | | 2/1974 | Capra |
| 4,021,877 A | | 5/1977 | Miner |
| 4,173,129 A | * | 11/1979 | Durham ...................... 464/130 |
| 4,194,923 A | | 3/1980 | Johnson |
| 4,198,722 A | | 4/1980 | Ennis |
| 4,225,995 A | | 10/1980 | Ennis |
| 4,270,958 A | | 6/1981 | Ennis |
| 4,299,003 A | | 11/1981 | Ennis |
| 4,332,625 A | | 6/1982 | Ennis |
| 4,354,291 A | | 10/1982 | Ennis |
| 5,267,904 A | * | 12/1993 | Geisthoff .................... 464/136 |
| 5,715,558 A | | 2/1998 | Johnson |

FOREIGN PATENT DOCUMENTS

| | | |
|---|---|---|
| JP | 62-74754 | 4/1987 |
| RU | SU-500-998 | 1/1973 |

* cited by examiner

*Primary Examiner*—Greg Binda
(74) *Attorney, Agent, or Firm*—Baniak Pine & Gannon (57) ABSTRACT

An apparatus and method directed to a rotatable coupling apparatus that can transfer a rotational force from a driving shaft to a driven shaft. The connecting apparatus includes two yokes, a universal joint cross, and two internal restricted swing mechanisms. A restriction of any swinging action of the driven shaft is provided by the internal swing mechanisms that are sized and shaped such that each approximates the internal surface and volume of the yokes. The invention also includes an apparatus and method for a coupling apparatus for use primarily in a vehicle wash apparatus.

3 Claims, 7 Drawing Sheets

BRUSH MOUNTING APPARATUS WITH RESTRICTED SWING AND METHODS THEREOF

This application claims the benefit of U.S. Provisional Application No. 60/323,593, filed on Sep. 20, 2001.

FIELD OF THE INVENTION

The present invention relates generally to an apparatus and methods for washing vehicles and, more particularly to a rotatable brush mounting apparatus with restricted swing, an improved brush mounting apparatus with restricted swing for rotating a wrap brush assembly as part of a vehicle wash apparatus, and methods for cleaning any exterior surfaces of a vehicle.

BACKGROUND OF THE INVENTION

The present invention has its genesis in the vehicle washing industry. While the invention will be particularly discussed with respect to embodiments in the vehicle washing industry arena, one should understood that this industry is but one application of the invention, and the invention has much broader scope.

So said, the vehicle wash industry utilizes apparatus with one or more rotating wrap brush assemblies for cleaning exterior surfaces of vehicles. A wrap brush assembly consists of a brush shaft with a plurality of cleaning strips connected along the length of the brush shaft. When the brush shaft is rotated, the cleaning strips are moved to a generally perpendicular position relative to the brush shaft by centrifugal force thereby providing a strip application force and a suitable brushing action for cleaning any exterior surface of a vehicle.

The cleaning strips can be constructed from a variety of materials, either absorbent or non-absorbent. Some examples of possible materials that can be used include cloth fabric, polyethylene, polystyrene, chamois and the like. Likewise, the cleaning strips can not only be a "strip" of material, but in other forms, such as cords twisted or woven together like a rope or a traditional mop.

A vehicle wash apparatus may employ various numbers and configurations of rotating wrap brush assemblies to ensure that all surfaces of a vehicle are effectively cleaned. Additionally, the wrap brush assembly is typically rotated in a direction that corresponds to the direction of the vehicle. Thus, if the car is moving forward past the wrap brush assembly, the wrap brush assembly is rotated so that the cleaning strips of the wrap brush assembly contact and move along a surface of the vehicle in a direction from the back of the vehicle towards the front of the vehicle. However, the wrap brush assembly can be rotated in either direction, or in both directions.

A wrap brush assembly must be positioned close enough to the vehicle in order that the cleaning strips contact the vehicle surface with a sufficient strip application force to efficiently clean the surface of a vehicle. However, the strip application force must not be so great that the wrap brush assembly is quickly worn or the vehicle or the wrap brush assembly is damaged.

One problem with a vehicle washing apparatus is that a vehicle has a multitude of different types of surfaces to be cleaned depending on the make and model of the vehicle. These various surfaces are manufactured or coated with various material types such as paint, glass, chrome, plastic, and rubber to mention a few. Each material type requires cleaning in a different manner, and each has a different level of resistance to damage. Not only do the surfaces differ in material type, also in position, location, height, width, and accessibility. Hard to reach surfaces of vehicles include areas between a mirror and a radio antenna, a wheel well, a rear license plate, or any of the nooks in a radiator grill. All of these different surfaces need to be efficiently cleaned by the vehicle washing apparatus and the wrap brush assembly without causing damage to the particular vehicle being washed or the vehicle wash apparatus.

Another problem with wrap brush assemblies is that, as the wrap brush assembly rotates and engages a surface of a vehicle, the plurality of cleaning strips that contact the surface cause the wrap brush assembly to "walk" or "climb" (hereinafter referred to as "climbing") along the surface of the vehicle. This climbing action is a result of the static and dynamic forces created when the cleaning strips come in contact with and are slid along the surface of the car. This climbing action stresses the brush shaft of the wrap brush assembly. In some situations, the wrap brush assembly actually does climb onto the top of the vehicle, resulting in inefficient cleaning of the vehicle and possible damage to the vehicle or the vehicle wash apparatus.

Yet another problem with wrap brush assemblies is that some vehicle wash apparatus require a driver to drive the vehicle to be cleaned through the vehicle wash apparatus. Different drivers utilizing such apparatus drive at different speeds. Some drivers drive the vehicles through the vehicle wash apparatus very quickly, thus not allowing for the wrap brush assemblies to respond and move out of the way of the rapidly driven vehicle. This stresses the parts of the vehicle wash apparatus and fails to efficiently clean the vehicle. In a drive-through vehicle wash apparatus, the wrap brush assembly needs to be able to quickly respond and move out of the way of a car being driven though the vehicle wash apparatus at a rapid pace, yet maintain contact with the exterior surface of the vehicle for efficient cleaning.

The prior art includes numerous apparatus and methods to address these needs and problems. Many of the apparatus and methods allow the wrap brush assemblies to swing about a pivot point. Still other apparatus utilize a pivot point in combination with one or more shock absorbers to maintain a constant pressure of wrap brush assembly against a vehicle.

U.S. Pat. No. 3,777,326, U.S. Pat. No. 3,708,816, and U.S. Pat. No. 3,304,565 utilize a parallelogram type linkage apparatus to control the pressure of the wrap brush assembly against a vehicle. The parallelogram type linkage apparatus allows for the wrap brush assembly to swing away from or toward a vehicle as needed, thus displacing, but not changing an axis of the wrap brush assembly. However, this type of linkage apparatus does not prevent the wrap bush assembly from climbing up a surface of the car.

U.S. Pat. No. 4,270,958, No. 4,332,625, No. 4,225,995, and No. 4,198,722 disclose a coupling apparatus to connect a wrap brush assembly shaft to a motor shaft by a toroidal-shaped flexible elastic coupling. The rotary action of the brush assembly combined with the toroidal-shaped flexible elastic coupling allow the vehicle wash apparatus to clean any exterior surface of a vehicle and minimize damage to the vehicle. However, use of the toroidal-shaped flexible elastic coupling does not completely eliminate the climbing of the wrap brush assembly onto the top of the vehicle.

U.S. Pat. No. 4,354,291 discloses a vehicle wash apparatus that employs a spring or a coil as the connection between the motor shaft and the brush shaft. Again, this connecting apparatus does not completely eliminate the climbing of the brush assembly onto the top of the vehicle.

U.S. Pat. No. 4,021,877 discloses a wrap brush assembly coupled to an upper shaft by use of a universal type joint apparatus. The yokes of the universal joint apparatus include brackets that permit the brush wrap assembly to be tilted out of vertical alignment in the direction of longitudinal travel only. Additionally, the tilting movement of the wrap brush assembly is limited by use of a spring. The construction of the wrap brush assembly and the spring are such that when the wrap brush assembly is tilted, the spring is compressed on one side, which urges the wrap brush assembly back into its original position. This construction of the apparatus again does not completely eliminate the climbing action of the wrap brush assembly onto the top of the vehicle.

As a result, there is a demand for an apparatus and method by which a vehicle may be cleaned in a vehicle wash apparatus without the climbing phenomena that prior art wrap brush assemblies produce. The present invention satisfies this demand.

SUMMARY OF THE INVENTION

It is an object of the present invention to provide a coupling apparatus for connecting a driving shaft with an axis to a driven shaft that can swing away as needed, but remain within a predetermined angle of the axis of the driving shaft.

It is an object of the present invention to provide a coupling apparatus for transmitting a rotational force from a driving shaft with an axis to a driven shaft such that the driven shaft may flex freely within a predetermined deflection angle between the driving shaft and the driven shaft, the coupling apparatus having a first yoke, a second yoke, a universal joint cross, a first internal restricted swing mechanism, and a second internal restricted swing mechanism. The first yoke and second yoke each have a first tine, a second tine, a shaft connector, an inner yoke surface, and an outer yoke surface. The universal joint cross has four ends just as does a traditional universal joint cross. The first and third ends of the universal joint cross are shaped to oppose each other and the second and fourth ends of the universal joint cross are shaped to oppose each other.

The first and third ends of the universal joint cross are pivotally connected to the first and second tines of the first yoke, respectively. The second and fourth ends of the universal joint cross are also pivotally connected to the first and second tines of the second yoke, respectively. The shaft connector of the first yoke is connected to the driving shaft and the shaft connector of the second yoke is connected to the driven shaft. The first internal restricted swing mechanism is sized and shaped to approximate the inner yoke surface of the first yoke. The first internal restricted swing mechanism is positioned between the first and second tines of the first yoke and is pivotally attached to the first and second tines of the second yoke. The second internal restricted swing mechanism is shaped to approximate the inner yoke surface of the second yoke.

The second internal restricted swing mechanism is positioned between the first and second tines of the second yoke and is pivotally attached to the first and second tines of the first yoke. A coupler allows the driven shaft to swing out of the axis, but remain within a predetermined angle of the driving shaft.

It is an object of the present invention to provide a coupling apparatus as above wherein the first internal restricted swing mechanism is fastened to the second yoke by use of a fastener and the second internal restricted swing mechanism is fastened to the first yoke by use of another fastener.

It is an object of the present invention to provide a coupling apparatus for coupling a driving shaft to a driven shaft as above wherein bearings or bushings are utilized to connect the tines of the yokes to the universal joint cross.

It is an object of the present invention to provide a coupling apparatus for coupling a driving shaft to a driven shaft as above wherein the first and the second internal restricted swing mechanisms are constructed from a force absorbing material to dampen any flexing of the driven shaft about the axis of the driving shaft.

It is an object of the present invention to provide a method of limiting a deflection angle between a driving shaft and a driven shaft comprising of coupling the driving shaft to the driven shaft with a coupling apparatus that has one or more internal angle limits. The deflection angle between the driving shaft and the driven shaft is varied. The driven shaft is restricted to a maximum deflection angle from the driving shaft when one or more of the internal angle limits reach a predetermined maximum deflection angle.

It is an object of the present invention to provide a brush mounting apparatus for a vehicle wash apparatus. The vehicle wash apparatus has a wrap brush assembly supporting means, a wrap brush assembly for washing one or more surfaces of a vehicle relative thereto, a shaft with a first end and a second end for rotating the wrap brush assembly, and a motor means for rotating the shaft that is mounted on the wrap brush assembly supporting means and connected to the first end of the shaft. The brush mounting apparatus comprising a first yoke, a second yoke, a universal joint cross, a first internal restricted swing mechanism, and a second internal restricted swing mechanism. The first and second yokes each have a first tine, a second tine, a shaft connector, an inner yoke surface, and an outer yoke surface.

The universal joint cross has four ends wherein the first and third ends of the universal joint cross are shaped to oppose each other. The second and fourth ends of the universal joint cross are also shaped to oppose each other. The first and third ends of the universal joint cross are pivotally connected to the first and second tines of the first yoke, respectively. The second and fourth ends of the universal joint cross are pivotally connected to the first and second tines of the second yoke, respectively. The shaft connector of the first yoke is shaped to connect to the second end of the shaft and the shaft connector of the second yoke is connected to the wrap brush assembly.

The first internal restricted swing mechanism is shaped to approximate the inner yoke surface of the first yoke and is positioned between the first and second tines of the first yoke. The first internal restricted swing mechanism is pivotally attached to the first and second tines of the second yoke. The second internal restricted swing mechanism is shaped to approximate the inner yoke surface of the second yoke and is positioned between the first and second tines of the second yoke. The second internal restricted swing mechanism is pivotally attached to the first and second tines of the first yoke.

It is an object of the present invention to provide a brush mounting apparatus for a vehicle wash apparatus similar to that described in the immediately preceding object, wherein the first internal restricted swing mechanism is fastened to the second yoke by use of a fastener and the second internal restricted swing mechanism is fastened to the first yoke by use of another fastener.

It is an object of the present invention to provide a brush mounting apparatus for a vehicle wash apparatus comprising a wrap brush assembly supporting means, a wrap brush assembly for washing one or more surfaces of a vehicle relative thereto, a shaft with two ends for rotating the wrap brush assembly, and a motor means for rotating the shaft that is mounted on the wrap brush assembly supporting means and is shaped to connect to the first end of the shaft. The brush mounting apparatus includes a first yoke, a second yoke, a universal joint cross, a first internal restricted swing mechanism, a second internal restricted swing mechanism, four bearing mounts, and four bearings. Each of the first and second yokes have a first tine, a second tine, an inner yoke surface, an outer yoke surface, and a shaft connector. Both yokes are formed to provide a yoke aperture or notch in the first tine and the second tine of each the yokes.

The first bearing mount is secured to the outer yoke surface about the aperture or notch of the first tine of the first yoke and the first bearing is secured in the first bearing mount. The second bearing mount is secured to the outer yoke surface about the aperture or notch of the second tine of the first yoke and the second bearing is secured in the second bearing mount. The third bearing mount is secured to the outer yoke surface about the aperture or notch of the first tine of the second yoke and the third bearing is secured in the third bearing mount. The fourth bearing mount is secured to the outer yoke surface about the aperture or notch of the second first tine of the second yoke and the fourth bearing is secured in the fourth bearing mount.

The universal joint cross has four ends, the first and third ends of the universal joint cross are shaped to oppose each other and the second and fourth ends of the universal joint cross are shaped to oppose each other. The first and third ends of the universal joint cross extend through the apertures or notch of the first yoke to be pivotally connected to the first and second bearings, respectively, and the second and fourth ends of the universal joint cross extend through the apertures or notch of the second yoke to be pivotally connected to the third and fourth bearings, respectively. The first yoke is connected to the second end of the shaft and the second yoke is connected to the wrap brush assembly.

The first internal restricted swing mechanism is sized and shaped to approximate the inner yoke surface of the first yoke and is positioned between the first and second tines of the first yoke. The first internal restricted swing mechanism is pivotally attached to the first and second tines of the second yoke and the second internal restricted swing mechanism is shaped to approximate the inner yoke surface of the second yoke. The second internal restricted swing mechanism is positioned between the first and second tines of the second yoke and is pivotally attached to the first and second tines of the first yoke.

It is an object of the present invention to provide a brush mounting apparatus similar to the immediately preceding object wherein the coupling apparatus is retro-fitted to an existing vehicle wash apparatus.

It is an object of the present invention to provide a method of cleaning any of the many exterior surfaces of a vehicle in a vehicle wash apparatus that includes a wrap brush assembly supporting means, a wrap brush assembly for washing one or more surfaces of the vehicle relative thereto, a shaft with two ends for rotating the wrap brush assembly, and a motor means for rotating the shaft that is mounted on the wrap brush assembly supporting means and is connected to the first end of the shaft. Also included is a brush mounting apparatus that has a first yoke, a second yoke, a universal joint cross, a first internal restricted swing mechanism, and a second internal restricted swing mechanism.

The first yoke and second yoke each have a first tine, a second tine, a shaft connector, an inner yoke surface, and an outer yoke surface. The universal joint cross has four ends wherein the first and third ends are shaped to oppose each other and the second and fourth ends are shaped to oppose each other. The first and third ends of the universal joint cross are pivotally connected to the first and second tines of the first yoke, respectively. The second and fourth ends of the universal joint cross are pivotally connected to the first and second tines of the second yoke, respectively. The shaft connector of the first yoke is connected to the second end of the shaft and the shaft connector of the second yoke is connected to the wrap brush assembly.

The first internal restricted swing mechanism is shaped to approximate the inner yoke surface of the first yoke and is situated between the first and second tines of the first yoke. The first internal restricted swing mechanism is pivotally attached to the first and second tines of the second yoke.

The second internal restricted swing mechanism is shaped to approximate the inner yoke surface of the second yoke and is situated between the first and second tines of the second yoke. The second internal restricted swing mechanism is positioned between the first and second tines of the second yoke and is pivotally attached to the first and second tines of the second yoke.

The method includes the first step of rotating the wrap brush assembly about an axis that is generally parallel to one the of many exterior surfaces of the vehicle. The next step is engaging the wrap brush assembly against the exterior surface of the advancing vehicle, followed by moving the rotating wrap brush assembly about the exterior surface or surfaces of the advancing vehicle. The final step is disengaging the wrap brush assembly from any of the surfaces of the vehicle as the vehicle advances past the wrap brush assembly.

It is an object of the present invention to provide a method of cleaning any of many exterior surfaces of a vehicle in the above vehicle wash apparatus. The vehicle wash apparatus includes: i) a wrap brush assembly supporting means, ii) a wrap brush assembly for washing one or more of the exterior surfaces of the vehicle relative thereto, iii) a shaft with an axis for rotating the wrap brush assembly, the shaft having a first end and a second end, iv) a motor means for rotating the shaft, the motor means is mounted on the wrap brush assembly supporting means and is connected to the first end of the shaft, and v) a brush mounting apparatus.

The brush mounting apparatus has a first yoke, a second yoke, a universal joint cross, a first internal restricted swing mechanism, and a second internal restricted swing mechanism. The first yoke and second yoke each have a first tine, a second tine, a shaft connector, an inner yoke surface, and an outer yoke surface.

The universal joint cross has four ends. The first and third ends of the universal joint cross are sized and shaped to oppose each other and the second and fourth ends of the universal joint cross are sized and shaped to oppose each other. The first and third ends of the universal joint cross are pivotally connected to the first and second tines of the first yoke, respectively. The second and fourth ends of the universal joint cross are pivotally connected to the first and second tines of the second yoke, respectively. The shaft connector of the first yoke is connected to the second end of the shaft. The shaft connector of the second yoke is connected to the wrap brush assembly. The first internal restricted swing mechanism is sized and shaped to approximate the inner yoke surface of the first yoke. The first internal restricted swing mechanism is situated between the first and second tines of the first yoke and is pivotally attached to the first and second tines of the second yoke. The second internal restricted swing mechanism is sized and shaped to approximate the inner yoke surface of the second yoke. The second internal restricted swing mechanism is situated between the first and second tines of the second yoke and is pivotally attached to the first and second tines of the first yoke.

The method includes the first step of rotating the wrap brush assembly about an axis that is generally parallel to one of the many exterior surfaces of the vehicle. The next step is driving the vehicle into the vehicle wash apparatus such that the wrap bush assembly engages against an exterior surface of the driven vehicle and then driving the vehicle through the vehicle wash apparatus such that the wrap brush assembly cleans any of the surfaces of the vehicle as the vehicle is driven past the wrap brush assembly. The next step is deflecting the wrap bush assembly, as needed, relative to the exterior surface of the driven vehicle. The method concludes with the step of driving the vehicle through the vehicle wash apparatus such that the wrap bush assembly disengages from any surface of the vehicle as the vehicle is driven away from the wrap brush assembly.

It is an object of the present invention to provide a brush mounting apparatus for a vehicle wash apparatus including a wrap brush assembly supporting means, a wrap brush assembly with two ends for washing one or more exterior surfaces of a vehicle relative thereto, a shaft with two ends and an axis for rotating the wrap brush assembly, a motor means for rotating the shaft mounted on the wrap brush assembly supporting means and connected to the first end of the shaft, a moveable bushing located in a channel of a rotatable mounting that is located on the wrap brush assembly supporting means, and a brush mounting apparatus. The brush mounting apparatus has a first yoke, a second yoke, a universal joint cross, a first internal restricted swing mechanism, and a second internal restricted swing mechanism. The first and second yokes each have a first tine, a second tine, a shaft connector, an inner yoke surface, and an outer yoke surface. The universal joint cross has four ends.

The first and third ends of the universal joint cross are shaped to oppose each other and the second and fourth ends of the universal joint cross are also shaped to oppose each other. The first and third ends of the universal joint cross are pivotally connected to the first and second tines of the first yoke, respectively. The second and fourth ends of the universal joint cross are pivotally connected to the first and second tines of the second yoke, respectively. The shaft connector of the first yoke is sized and shaped to connect to the second end of the shaft and the shaft connector of the second yoke is connected to the first end of the wrap brush assembly. The second end of the wrap brush assembly is pivotally connected to the movable bushing. The moveable bushing, the rotatable mounting, and the channel operate such that the wrap brush assembly can rotate freely within a deflection angle of the axis and be supported at the second end of the wrap brush assembly.

The first internal restricted swing mechanism is sized and shaped to approximate the inner yoke surface of the first yoke. The first internal restricted swing mechanism is positioned between the first and second tines of the first yoke and is pivotally attached to the first and second tines of the second yoke. The second internal restricted swing mechanism is sized and shaped to approximate the inner yoke surface of the second yoke. The second internal restricted swing mechanism is positioned between the first and second tines of the second yoke and is pivotally attached to the first and second tines of the first yoke.

It is an object of the present invention to provide a method of cleaning any of many exterior surfaces of a vehicle in the above vehicle wash apparatus. The vehicle wash apparatus includes: i) a wrap brush assembly supporting means, ii) a wrap brush assembly for washing one or more exterior surfaces of the vehicle relative thereto, the wrap brush assembly having a first end and a second end, iii) a shaft with an axis for rotating the wrap brush assembly, the shaft having a first end and a second end, iv) a motor means for rotating the shaft, the motor means is mounted on the wrap brush assembly supporting means and is connected to the first end of the shaft, v) a moveable bushing located in a channel of a rotatable mounting, the rotatable mounting is located on the wrap brush assembly supporting means, and vi) a brush mounting apparatus.

The brush mounting apparatus has a first yoke, a second yoke, a universal joint cross, a first internal restricted swing mechanism, and a second internal restricted swing mechanism. The first yoke and second yoke each have a first tine, a second tine, a shaft connector, an inner yoke surface, and an outer yoke surface.

The universal joint cross has four ends. The first and third ends of the universal joint cross sized and shaped to oppose each other and the second and fourth ends of the universal joint cross sized and shaped to oppose each other. The first and third ends of the universal joint cross are pivotally connected to the first and second tines of the first yoke, respectively. The second and fourth ends of the universal joint cross are pivotally connected to the first and second tines of the second yoke, respectively. The shaft connector of the first yoke is connected to the second end of the shaft. The shaft connector of the second yoke is connected to the first end of the wrap brush assembly. The second end of the wrap brush assembly is pivotally connected to the movable bushing. The moveable bushing, the rotatable mounting, and the channel operate such that the wrap brush assembly can rotate freely within a deflection angle of the axis and be supported at the second end of the wrap brush assembly. The first internal restricted swing mechanism is sized and shaped to approximate the inner yoke surface of the first yoke. The first internal restricted swing mechanism is situated between the first and second tines of the first yoke and is pivotally attached to the first and second tines of the second yoke. The second internal restricted swing mechanism is sized and shaped to approximate the inner yoke surface of the second yoke. The second internal restricted swing mechanism is situated between the first and second tines of the second yoke and is pivotally attached to the first and second tines of the first yoke.

The method includes the first step of rotating the wrap brush assembly about an axis that is generally parallel to one the of many exterior surfaces of the vehicle. The next step is the act of engaging the wrap brush assembly against the exterior surface of the vehicle. The next steps are moving the vehicle past the rotating wrap brush assembly that is supported at both the first and second ends to wash any of the many exterior surfaces of the vehicle and deflecting the wrap brush assembly, as needed, relative to the exterior surface of the driven vehicle. The final step is disengaging the wrap brush assembly from any of the many exterior surfaces of the vehicle.

It is an object of the present invention to provide a method of cleaning any of the many exterior surfaces of a vehicle in the above vehicle wash apparatus. The vehicle wash apparatus includes: i) a wrap brush assembly supporting means, ii) a wrap brush assembly for washing one or more of the exterior surfaces of the vehicle relative thereto, iii) a shaft with an axis for rotating the wrap brush assembly, the shaft having a first end and a second end, iv) a motor means for rotating the shaft, the motor means is mounted on the wrap brush assembly supporting means and is connected to the first end of the shaft, and v) a brush mounting apparatus. The brush mounting apparatus has a first yoke, a second yoke, a universal joint cross, a first internal restricted swing mechanism, and a second internal restricted swing mechanism. The first yoke and second yoke each have a first tine, a second tine, a shaft connector, an inner yoke surface, and an outer yoke surface.

The universal joint cross has four ends. The first and third ends of the universal joint cross sized and shaped to oppose each other and the second and fourth ends of the universal joint cross sized and shaped to oppose each other. The first and third ends of the universal joint cross are pivotally connected to the first and second tines of the first yoke, respectively. The second and fourth ends of the universal joint cross are pivotally connected to the first and second tines of the second yoke, respectively. The shaft connector of the first yoke is connected to the second end of the shaft. The shaft connector of the second yoke is connected to the wrap brush assembly.

The first internal restricted swing mechanism is sized and shaped to approximate the inner yoke surface of the first yoke. The first internal restricted swing mechanism is situated between the first and second tines of the first yoke and is pivotally attached to the first and second tines of the second yoke. The second internal restricted swing mechanism is sized and shaped to approximate the inner yoke surface of the second yoke. The second internal restricted swing mechanism is situated between the first and second tines of the second yoke and is pivotally attached to the first and second tines of the first yoke.

The method includes the first step of rotating the wrap brush assembly about an axis that is generally parallel to one of many the exterior surfaces of the vehicle. The next steps are driving the vehicle into the vehicle wash apparatus such that the wrap brush assembly engages against an exterior surface of the driven vehicle, followed by driving the vehicle through the vehicle wash apparatus such that the wrap brush assembly cleans any of the surfaces of the vehicle as the vehicle is driven past the wrap brush assembly. The next step is deflecting the wrap brush assembly, as needed, relative to the exterior surface of the driven vehicle. The final step is driving the vehicle through the vehicle wash apparatus such that the wrap brush assembly disengages from any surface of the vehicle as the vehicle is driven away from the wrap brush assembly.

These and other objectives, features, and advantages achieved by the invention will be further understood upon consideration of the following detailed description of embodiments of the invention taken in conjunction with the drawings.

DETAILED DESCRIPTION OF EMBODIMENTS OF THE INVENTION

Figure 1:
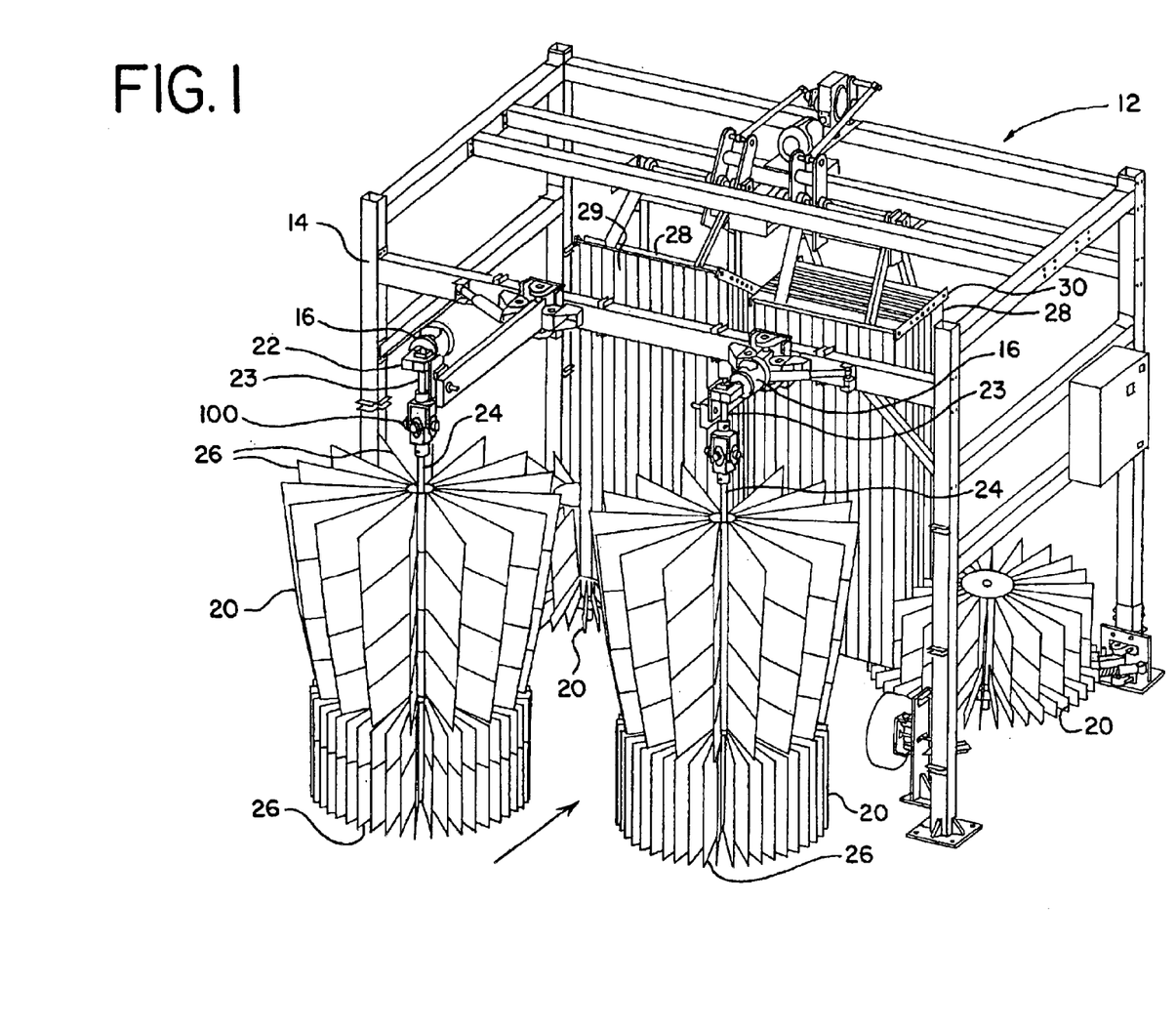
FIG. 1 is a perspective front elevational view of a vehicle wash apparatus constructed in accordance with the teachings of the present invention.

A vehicle wash apparatus according to the present invention is identified in the accompanying FIGS. as 12. This specific vehicle wash apparatus 12 includes a wrap brush assembly supporting means 14 and motors 16 with a motor shaft (not shown) for rotating a wrap brush assembly 20 about an axis. This embodiment utilizes four wrap brush assemblies 20. Each motor 16 is mounted in some fashion upon the wrap brush assembly supporting means 14. Each motor shaft (not shown) is connected in some manner (via a coupling, directly, etc.) to each of the wrap brush assemblies 20. In this embodiment, the motor shaft (not shown) is connected with a gear box 22 wherein the rotational force is transferred to a gear shaft 23, which in turn is connected in some manner to a brush shaft 24. Each of the wrap brush assemblies 20 consists of the brush shaft 24 with a plurality of cleaning strips 26 connected along the length of the brush shaft. When the motor 16, the motor shaft (not shown), the gear shaft 23, and the brush shaft 24 are rotated, the cleaning strips 26 are moved to a generally perpendicular position relative to the brush shaft 24 by centrifugal force thereby providing the suitable brushing action for cleaning any exterior surface of a vehicle (not shown). This vehicle wash apparatus 12 also includes two hanging brush assemblies 28. Each hanging brush assembly 28 includes a plurality of cleaning strips 29 connected along the length of a hanging bracket 30. The hanging bracket 30 is repeatedly moved back and forth (or side to side or up and down) as the vehicle proceeds through the vehicle wash apparatus 12, thus dragging the plurality of cleaning strips 29 along a top surface of the vehicle. This dragging of the strips ensures sufficient brushing and cleaning of the top surface of a vehicle.

Each vehicle washing apparatus 12 usually includes a soap application system (not shown) for applying soap about the surfaces of a vehicle prior to the application of the rotating wrap brush assemblies 20 about the surfaces of the vehicle. Additionally, each vehicle washing apparatus 12 usually includes a rinse system (not shown) for rinsing the soap and any dirt off of the surfaces of the vehicle after application of the rotating wrap brush assemblies 20 against the surfaces of the vehicle. Finally, most vehicle washing apparatus 12 includes a blast air system (not shown) for drying any remaining rinsing agent from the surfaces of a vehicle after operation of the rinse system.

A vehicle wash apparatus 12 may vary in the number and configurations of the rotating wrap brush assemblies 20 employed to ensure that all surfaces of a vehicle are effectively cleaned. Another feature that is not shown but constitutes a part of the prior art is a tire channel with a series of boots that periodically move through the tire channel. The purpose of the tire channel with the series of boots is to "pick-up" the next vehicle in line to be washed. The boots move through the tire channel at a predetermined interval and rate to ensure that any vehicle being moved through the vehicle wash apparatus is efficiently and properly washed.

Additionally, a computer with a program may operate the entire vehicle wash apparatus 12, wherein the wrap brush assemblies 20 are moved (not shown) in predetermined patterns that coincide with the position of each periodic boot. Such arrangement and operation provides for momentarily moving the wrap brush assemblies 20 in front of a vehicle being washed as well as in back of the vehicle as the vehicle passes through the vehicle wash apparatus 12 to ensure that all surfaces are sufficiently cleaned. Such a "programmed" vehicle wash apparatus 12 also aids in minimizing costs of operation of the vehicle wash apparatus 12 by operating each portion of the apparatus (wrap brush assemblies, soap application system, rinse system, etc.) when a vehicle is being washed and the specific portion of the apparatus is needed in the washing process.

Figure 2:
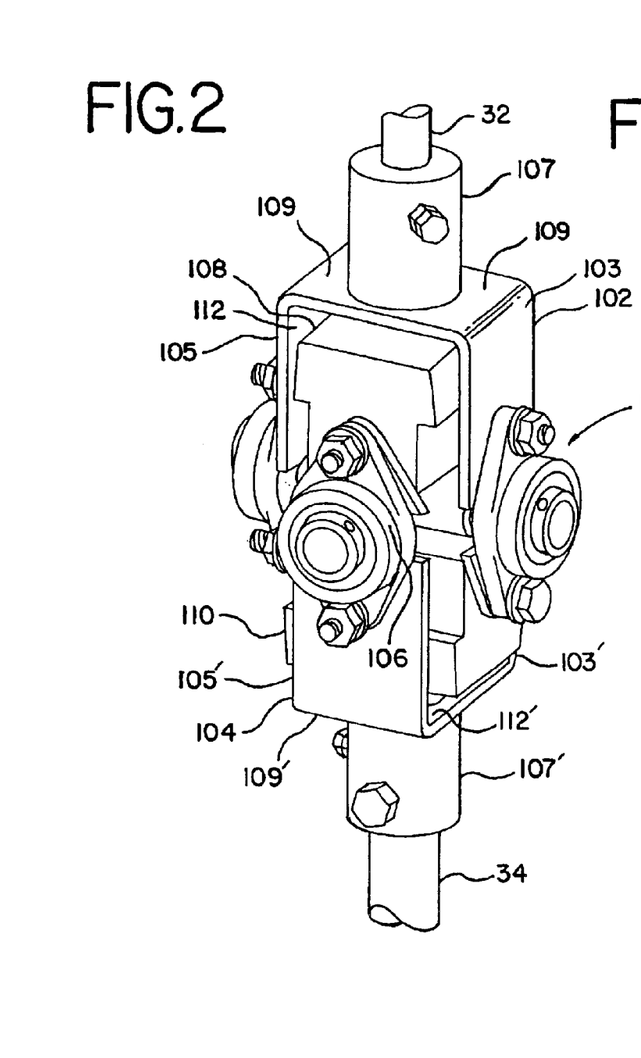
FIG. 2 is a perspective front elevational view of a coupling apparatus with internal restricted swing mechanisms.

The embodiment of the present invention shown in FIG. 1 includes a coupling apparatus 100 shown enlarged in FIG. 2. FIG. 2 reveals a restricted swing coupling apparatus 100 for transmitting a rotational force from a driving shaft 32 aligned along an axis to a driven shaft 34. The restricted swing coupling apparatus 100 is comprised of a first yoke 102, a second yoke 104, a universal joint cross 106, a first internal restricted swing mechanism 108, and a second internal restricted swing mechanism 110. The first and second yokes 102 and 104 each respectively have a first tine 103, 103', a second tine 105, 105', a shaft connector 107, 107', an inner yoke surface 112, 112', and an outer yoke surface 109, 109'. The coupling apparatus 100 is responsive to a force of an object (not shown) against the driven shaft 34 for flexing freely within a predetermined angle about an axis allowed by an first internal restricted swing mechanism 108 and a second internal restricted swing mechanism 110 located within said yokes 102 and 104, respectively.

In other embodiments, one or more internal restricted swing mechanisms can be used. Further it is envisioned that the internal restricted swing mechanisms 108 and 110 located within said yokes 102 and 104 are pivotally fastened directly to the yokes, by use of a fastener, by use of a bolt and a nut, or any other comparable ways.

Figure 3:
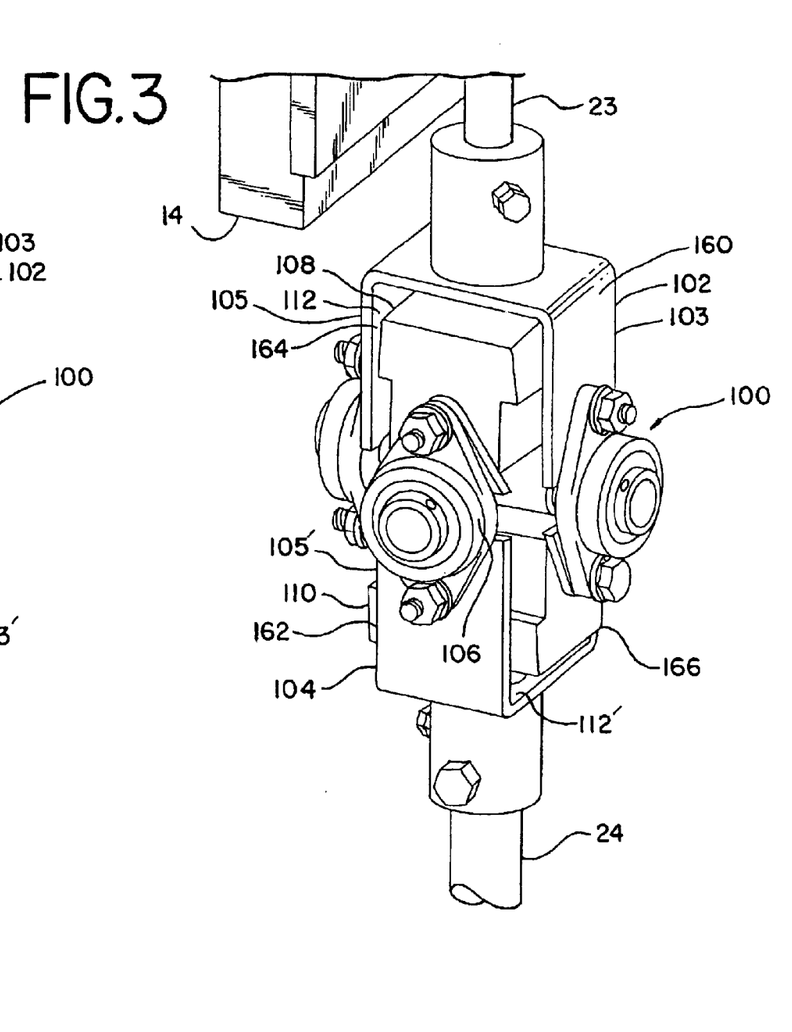
FIG. 3 is a perspective front elevational view of a brush mounting apparatus with internal restricted swing mechanisms shown in FIG. 1.

FIG. 3 reveals a portion of a wrap brush assembly supporting means 14 FIG. 3 illustrates the connection of the brush mounting apparatus with restricted swing coupling apparatus 100 to a gear shaft 23 and a brush shaft 24. The brush mounting apparatus with restricted swing coupling apparatus 100 is comprised of the universal type joint with a first yoke 102, a second yoke 104, a universal joint cross 106, a first internal restricted swing mechanism 108, and a second internal restricted swing mechanism 110. The brush mounting apparatus with restricted swing coupling apparatus 100 is responsive to a force of a vehicle (not shown) against the wrap brush assembly (not shown) for flexing freely within a predetermined radius about an axis defined by the gear shaft 23 allowed by contact of the first internal restricted swing mechanism 108 and the second internal restricted swing mechanism 110 against the yokes 102 and 104, respectively.

Figure 4:
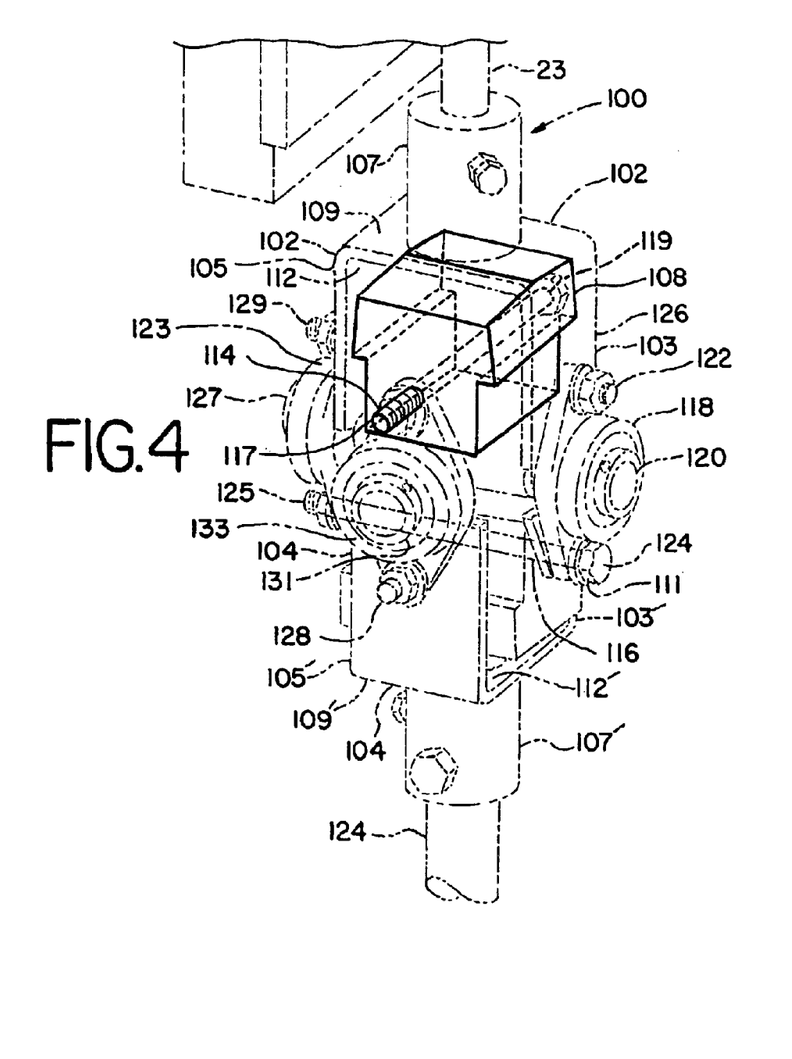
FIG. 4 is a perspective front elevational view of a brush mounting apparatus with internal restricted swing mechanisms shown in FIG. 3, emphasizing the first internal restricted swing mechanism.

FIG. 4 provides further details of the present invention. FIG. 4 emphasizes the first internal restricted swing mechanism 108 of the brush mounting apparatus with restricted swing coupling apparatus 100 of FIG. 3. The illustrated embodiment of the universal joint cross 106 includes four ends, wherein the first and third ends of the universal joint cross 106 oppose each other and the second and fourth ends of said universal joint cross 106 oppose each other. The first and second yokes 102 and 104 each respectively include a first tine 103, 103', a second tine 105, 105', a shaft connector 107, 107', an inner yoke surface 112, 112', and an outer yoke surface 109 109'. The first and third ends of said universal joint cross 106 are pivotally connected to the first tine 103 and second tine 105 of the first yoke 102. The second and fourth ends of the universal joint cross 106 are pivotally connected to the first tine 103' and second tine 105' of the second yoke 104. The shaft connector 107 of the first yoke 102 is shown as connected to the gear shaft 23. The shaft connector 107' of the second yoke 104 is shown as connected to the wrap brush assembly shaft 24.

The first internal restricted swing mechanism 108 is preferably sized and shaped to approximate the inner yoke surface 112 of the first yoke 102. In the illustrated embodiment, the first internal restricted swing mechanism 108 is situated between the first tine 103 and second tine 105 of the first yoke 102 and is pivotally attached to the first tine 103' and second tine 105' of said second yoke 104. The second internal restricted swing mechanism 110 is preferably sized and shaped to approximate the inner yoke surface 112' of said second yoke 104. The second internal restricted swing mechanism 110 is preferably situated between the first time 103' and second tine 105' of the second yoke 104 and is pivotally attached to the first and second times of the first yoke 102.

In the figure 4 embodiment, the first internal restricted swing mechanism 108 is pivotally secured to both tines of the second yoke 104 by use of a first fastener 114 at a first securing point 117 and a second securing point 119. The second internal restricted swing mechanism 110 is pivotally secured by both tines of the first yoke 102 by use of a second fastener 116 at a third securing point 124 and a fourth securing point 125. It is envisioned that the internal restricted swing mechanisms 108 and 110 located within said yokes 102 and 104 are pivotally fastened directly to the yokes, by use of a fastener, or any other comparable way. However, this and the other securing point can be secured by a different fasteners.

Further, it is envisioned, that the present invention can be constructed wherein the internal restricted swing mechanisms 108 and 110 are located within and are not fastened to the yokes 102 and 104. The internal restricted swing mechanisms 108 and 110 can be free-floating within the four tines and separated by the universal joint cross 106. Still, it is envisioned that the present invention may employ one or more internal restricted swing mechanisms. Further, it is envisioned that internal restricted swing mechanisms 108 and 110 located within said yokes 102 and 104 can be of different sizes and shapes such as an orb or a rectangle.

FIG. 4 also emphasizes the incorporation of a first bearing housing 118 and a first bearing 120 designed for pivoting about the universal joint cross 106. The first bearing housing 118 is secured to a first tine 103 of the first yoke 102 at a fifth securing point 122 and at the third securing point 124. The third securing point 124 secures the first bearing housing 118 to the first tine 103 of the first yoke 102. The fifth securing point 122 also secures the first bearing housing 118 to the first tine 103 of the first yoke 102. The fifth securing point 122 also secures the first bearing housing 118 to the first tine 103 of the first yoke 102 by use of the second fastener 116 previously described (i.e. the second fastener 116 pivotally secures the second internal restricted swing mechanism 110 to both tines of the first yoke 102).

A second bearing housing 123 and a second bearing 127 are secured to the second tine 105 of the first yoke 102 in a mirror image fashion compared to that of the first tine 103 of the first yoke 102. The second bearing housing 123 is secured to the second tine 105 of the first yoke 102 at the fourth securing point 125 previously described and at a sixth securing point 129 by use of a fourth fastener.

A third bearing housing 131 and a third bearing 133 are similarly secured to the second tine 105' of the second yoke 104 at the first securing point 117 and a seventh securing point 128. Likewise a fourth bearing housing 130 (See FIG. 5) and a fourth bearing 132 (See FIG. 5, rotated relative to FIG. 4) are attached to the first tine 103' of the second yoke 104 at the second securing point 119 and an eighth securing point 139.

It is envisioned that bearing housings 118, 123, 131, and 130 and bearings 120, 127, 133, and 132 can be replaced with bushings and the like. It is also envisioned that the present invention can be constructed without bearing housings 118, 123, 131, and 130 or bearings 120, 127, 133, and 132, bushings, or the like. Yet further, it is envisioned that utilizing a nut and a bolt to fasten the bearing mounts to the tines is but one way to secure or attach the bearing mounts. It is envisioned that the present invention includes securing the bearing mounts to the tines by employing a fasteners, welding the components, or any other similar manner.

Figure 5:
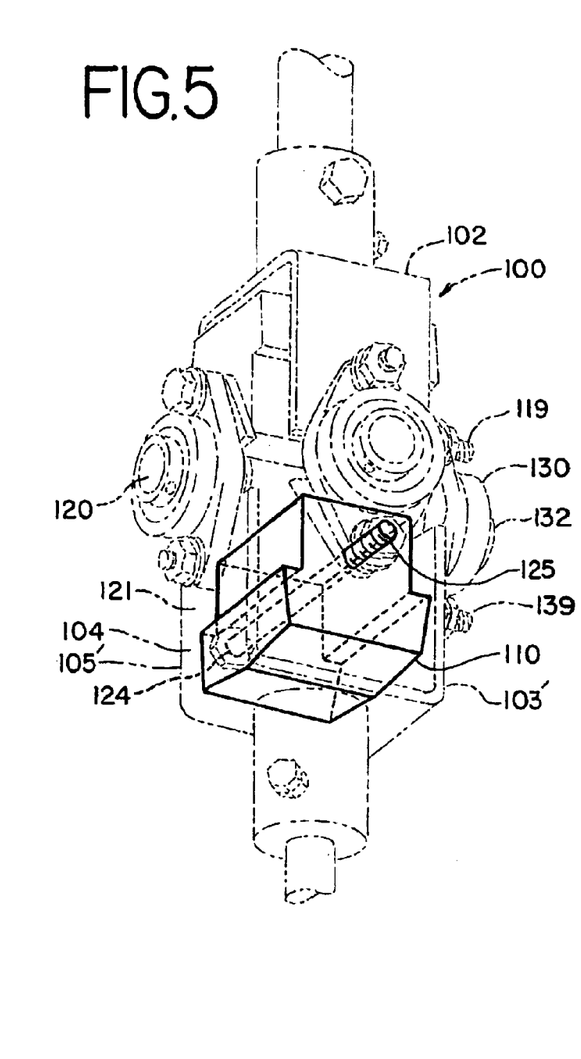
FIG. 5 is a perspective front elevational view of a brush mounting apparatus with internal restricted swing mechanisms shown in FIG. 3, emphasizing the second internal restricted swing mechanism.

FIG. 5 illustrates the brush mounting apparatus with restricted swing coupling apparatus 100 of FIG. 3 rotated clockwise 90 degrees. FIG. 5 illustrates the second internal restricted swing mechanism 110. The second internal restricted swing mechanism 110 is shaped and sized to approximate the inner yoke surface 121 of the second yoke 104.

Figure 6:
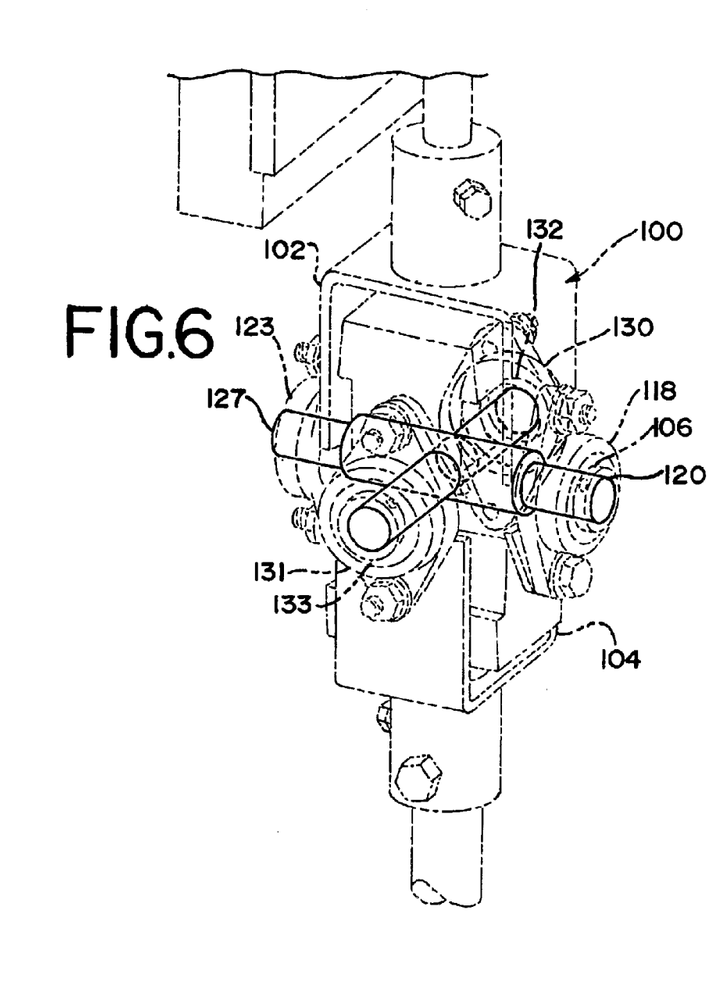
FIG. 6 is a perspective front elevational view of a brush mounting apparatus with internal restricted swing mechanisms shown in FIG. 3, emphasizing the universal joint cross.

FIG. 6 illustrates the universal joint cross 106 of the brush mounting apparatus with restricted swing coupling apparatus 100 of FIG. 3. In this embodiment, the four bearings 120, 127, 133, and 132 and four bearing housings 118, 123, 131, and 130 can be individually removed and replaced as needed or desired. However it is envisioned that the present invention may be constructed in a one-piece manner wherein the bearings and bearing housings cannot be removed and replaced.

Figure 7:
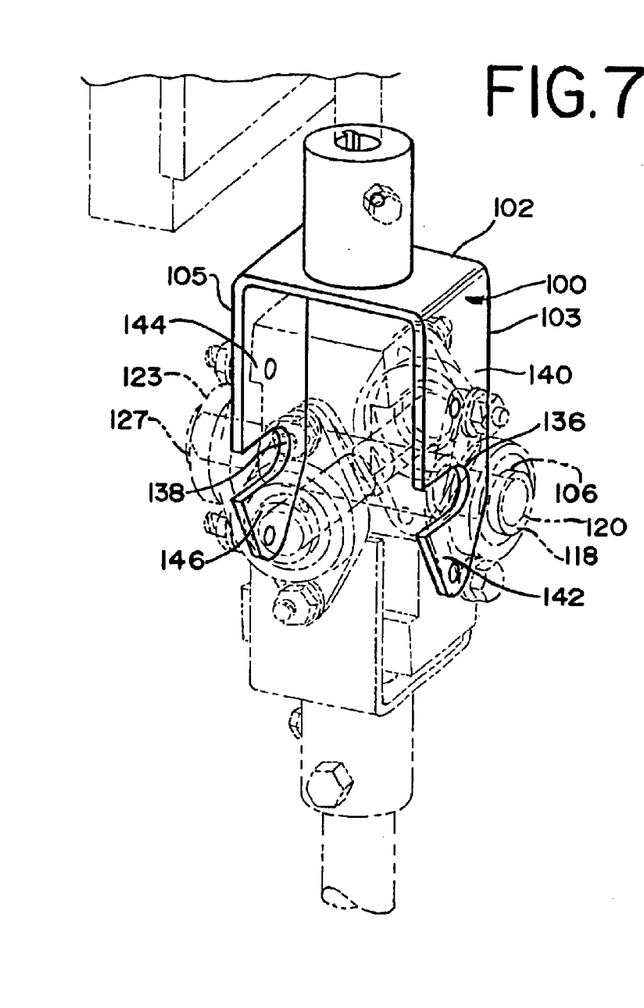
FIG. 7 is a perspective front elevational view of a brush mounting apparatus with internal restricted swing mechanisms shown in FIG. 3, emphasizing the first yoke of the brush mounting apparatus with restricted swing.

FIG. 7 illustrates the first yoke 102 of the brush mounting apparatus with restricted swing coupling apparatus 100 of FIG. 3. The first yoke 102 is formed to have a first notch 136 and a second notch 138 for receiving and securing the universal joint cross 106. The first tine of the first yoke 102 includes two apertures 140 and 142 for securing the first bearing housing 118. The second tine 105 of the first yoke 102 also includes two apertures 144 and 146 for securing the second bearing housing 123. (See FIG. 4).

Figure 8:
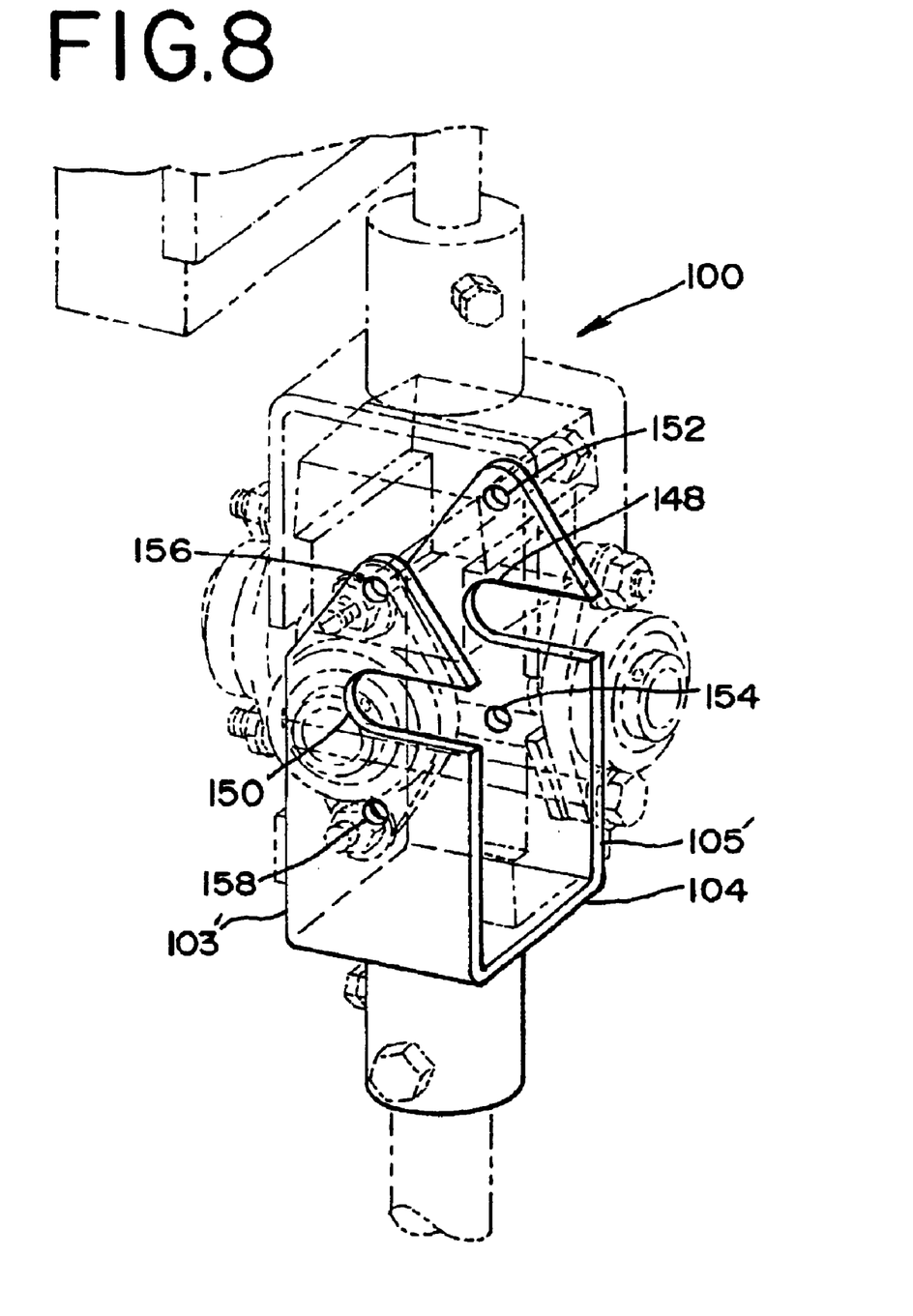
FIG. 8 is a perspective front elevational view of a brush mounting apparatus with internal restricted swing mechanisms shown in FIG. 3, emphasizing the second yoke of the brush mounting apparatus with restricted swing.

FIG. 8 illustrates the second yoke 104 of the brush mounting apparatus with restricted swing coupling apparatus 100 of FIG. 3. The second yoke 104 is formed to have a third notch 148 and a fourth notch 150 for receiving and securing the universal joint cross 106. The first tine 103' of the second yoke 104 includes two apertures 156 and 158 for securing the third bearing housing 131. The second tine 105' of the second yoke 104 includes also two apertures 152 and 154 for securing the fourth bearing housing 130. (See FIGS. 4 and 5).

Figure 9:
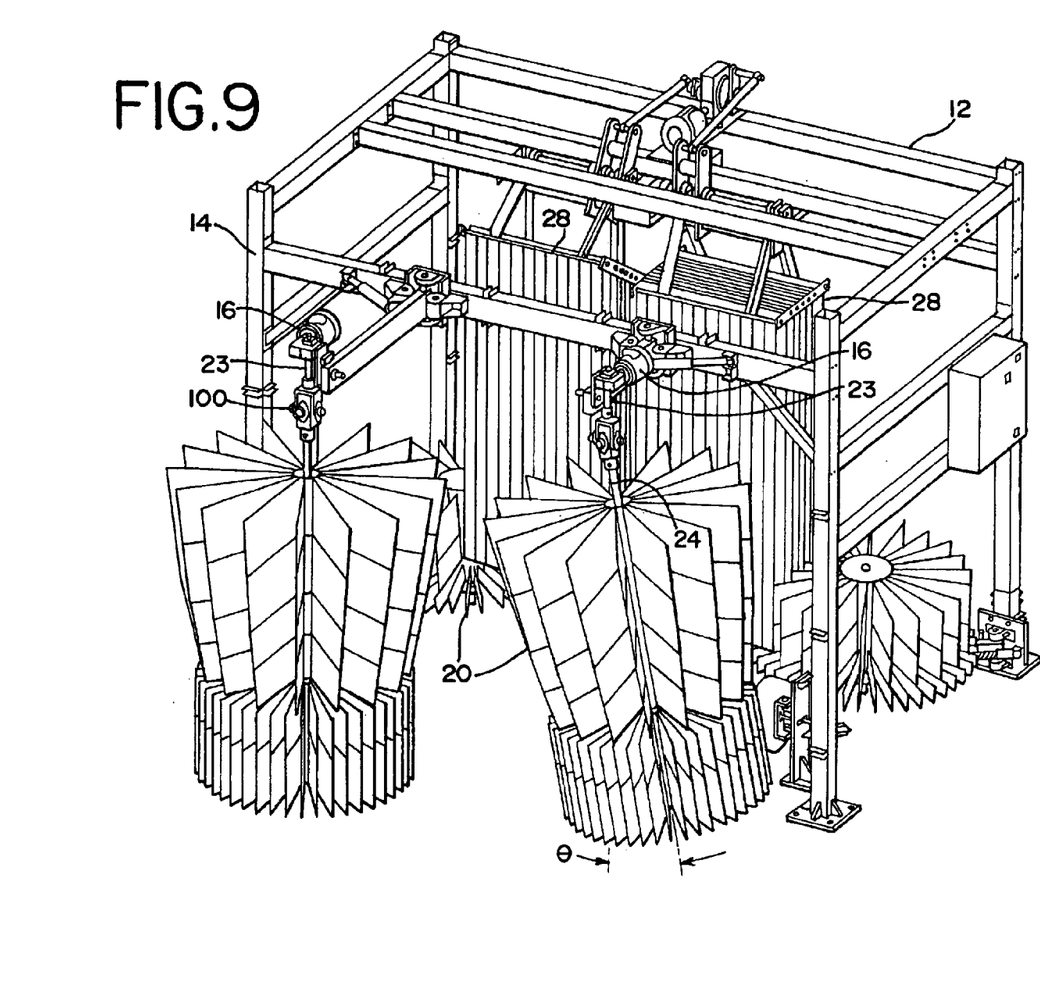
FIG. 9 is a perspective front elevational view of vehicle wash apparatus with a brush mounting apparatus with internal restricted swing mechanisms, illustrating the maximum deflection angle, θ, of the wrap brush assembly.

FIG. 9 illustrates a deflection angle, θ, of the wrap brush assembly 20 with respect to the gear shaft 23 using the brush mounting apparatus with restricted swing coupling apparatus 100. The deflection angle of the wrap brush assembly 20 is limited by the first internal restricted swing mechanism 108 against the inner yoke surface 112 of the first tine 103 of the first yoke 102 at contact 160 (see FIG. 3) and by the second internal restricted swing mechanism 110 against the inner yoke surface 112' of the second tine 105' of the second yoke 104 at contact 162. As the gear shaft 23 rotates the wrap brush assembly 20, the deflection angle of the wrap brush assembly 20 is again limited by the first internal restricted swing mechanism 108 against the inner yoke surface 112 of the second tine 105 of the first yoke 102 at contact 164 and by the second internal restricted swing mechanism 110 against the inner yoke surface 112' of the first tine 103' of the second yoke 104 at contact 166. This swinging back-and-forth motion of the second yoke 104 and the wrap brush assembly 20 in any direction (e.g. side-to-side, forward or backward, or a combination thereof) is limited to the deflection angle due to the contacts 160, 162, 164, 166, or a combination thereof.

Figure 10:
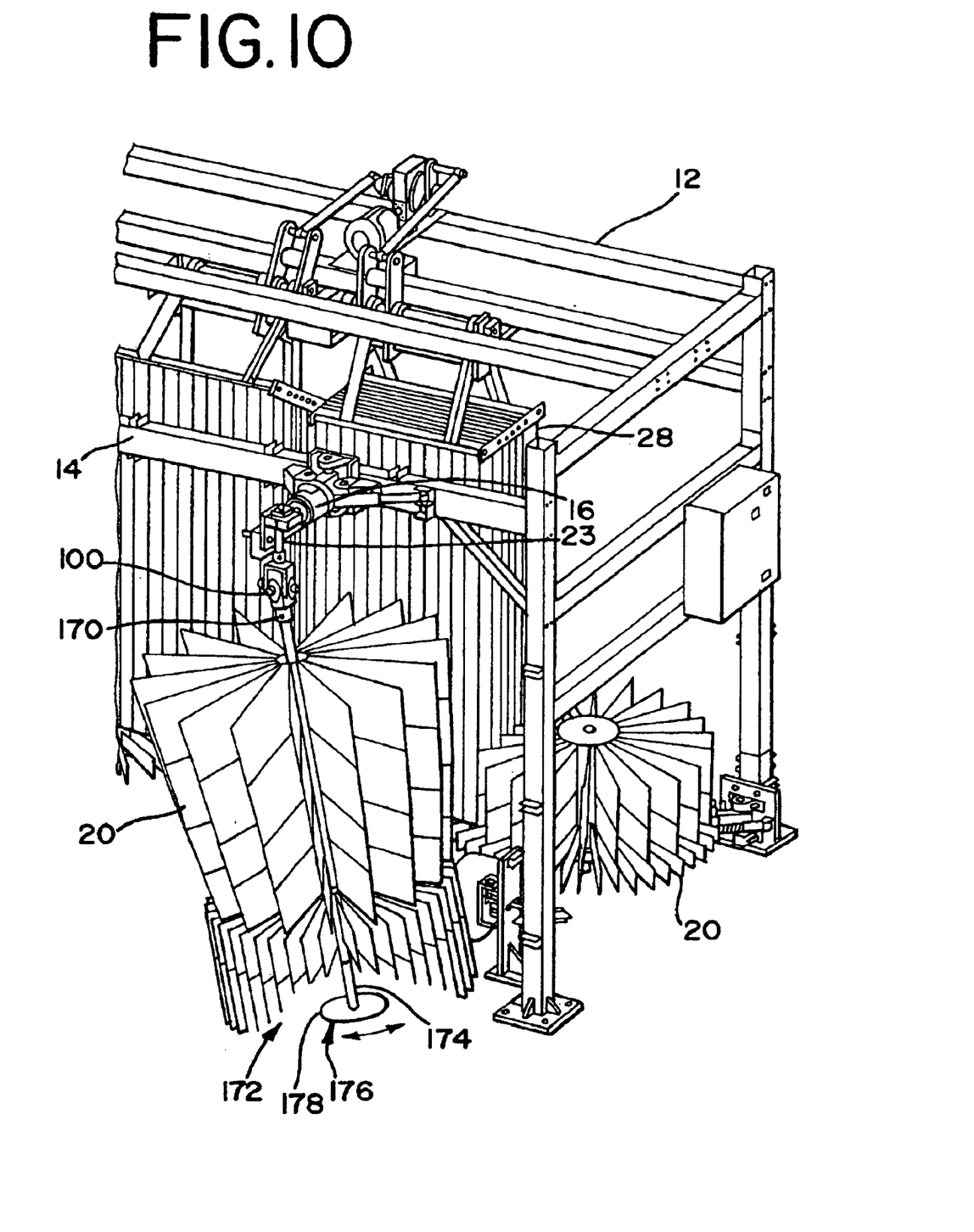
FIG. 10 a perspective front elevational view of a vehicle wash apparatus with a cut away, illustrating another form of a vehicle wash apparatus constructed in accordance with the teachings of the present invention.

FIG. 10 illustrates a vehicle washing apparatus 12 including a wrap brush assembly supporting means 14, a motor 16, a gear shaft 23, a brush mounting apparatus with restricted swing 100, and a wrap brush assembly 20 with a first end 170 and a second end 172. Both ends 170 and 172 of the wrap brush assembly 20 are supported as the wrap brush assembly 20 is rotated. The first end 170 of the wrap brush assembly 20 is connected to and supported by the brush mounting apparatus with restricted swing 100 in a manner similar to that discussed previously. The second end 172 of the wrap brush assembly 20 is connected to and supported by a moveable bushing 174 located in a bushing channel 178 of a rotatable mounting 176. The moveable bushing 174, the rotatable mounting 176, and the bushing channel 178 operate such that the wrap brush assembly can rotate freely within the deflection angle (not shown), yet be supported at both the first end 170 and second end 172 of the wrap brush assembly 20.

Thus, while the invention has been disclosed and described with respect to certain embodiments, those of skill in the art will recognized modifications, changes, other applications and the like which will nonetheless fall within the spirit and ambit of the invention, and the following claims are intended to capture such variations.

I claim:

1. A coupling apparatus for transmitting a rotational force from a driving shaft with an axis to a driven shaft such that the driven shaft may move freely within a predetermined deflection angle between the driving shaft and the driven shaft, said coupling apparatus comprising:

a first yoke, a second yoke, a universal joint cross, a first internal restricted swing mechanism, and a second internal restricted swing mechanism;

said first yoke and said second yoke each including a first tine, a second tine, a shaft connector, an inner yoke surface, and an outer yoke surface;

said universal joint cross including four ends, said first and third ends of said universal joint cross sized and shaped to oppose each other and said second and fourth ends of said universal joint cross sized and shaped to oppose each other;

said first and third ends of said universal joint cross being pivotally connected to said first yoke first and second tines, respectively, and said second and fourth ends of said universal joint cross being pivotally connected to said second yoke first and second tines, respectively;

said first yoke shaft connector being sized and shaped to connect to the driving shaft;

said second yoke shaft connector being sized and shaped to connect to the driven shaft;

said first internal restricted swing mechanism being sized and shaped to approximate said first yoke inner yoke surface, said first internal restricted swing mechanism being positioned between said first and second tines of said first yoke and pivotally attached to said second yoke first and second tines; and said second internal restricted swing mechanism being sized and shaped to approximate said second yoke inner yoke surface, said second internal restricted swing mechanism being positioned between said second yoke first and second tines and pivotally attached to said first yoke first and second tines.

2. A coupling apparatus for transmitting a rotational force from a driving shaft with an axis to a driven shaft, such that the driven shaft may move freely within a predetermined deflection angle between the driving shaft and the driven shaft, said coupling apparatus comprising:

a first yoke, a second yoke, a universal joint cross, a first internal restricted swing mechanism, a second internal restricted swing mechanism, a first fastener, and a second fastener;

said first yoke and said second yoke each include a first tine, a second tine, a shaft connector, an inner yoke surface, and an outer yoke surface;

said universal joint cross including four ends, said first and third ends of said universal joint cross sized and shaped to oppose each other and said second and fourth ends of said universal joint cross sized and shaped to oppose each other;

said first and third ends of said universal joint cross being pivotally connected to said first yoke first and second tines, respectively, and said second and fourth ends of said universal joint cross being pivotally connected to said second yoke first and second tines, respectively;

said first yoke shaft connector being sized and shaped to connect to the driving shaft;

said second yoke shaft connector being sized and shaped to connect to the driven shaft;

said first fastener being positioned between said first yoke first and second tines; said first fastener is connected to said second yoke first and second tines;

said second fastener being positioned between said second yoke first and second tines; said second fastener is connected to said first yoke first and second tines;

said first internal restricted swing mechanism being sized and shaped to approximate said first yoke inner yoke surface, said first internal restricted swing mechanism being positioned between said first yoke first and second tines and pivotally attached about said first fastener; and said second internal restricted swing mechanism being sized and shaped to approximate said second yoke inner yoke surface, said second internal restricted swing mechanism being positioned between said second yoke first and second tines and pivotally attached about said second fastener.

3. The coupling apparatus of claim 1 or 2 wherein said first internal restricted swing mechanism and said second internal restricted swing mechanism are constructed from a force absorbing material to dampen the flexing of the driven shaft about the axis of the driving shaft.

* * * * *